United States Patent [19]

Suzuki et al.

[11] Patent Number: 4,978,196

[45] Date of Patent: Dec. 18, 1990

[54] DISPLAY APPARATUS FOR A VEHICLE

[75] Inventors: Yoshiyuki Suzuki; Kunimitsu Aoki, both of Susono, Japan

[73] Assignee: Yazaki Corporation, Japan

[21] Appl. No.: 358,516

[22] Filed: May 30, 1989

Related U.S. Application Data

[63] Continuation of Ser. No. 181,583, Apr. 14, 1988, abandoned.

[30] Foreign Application Priority Data

Apr. 15, 1987 [JP] Japan ................................ 62-090724
Apr. 15, 1987 [JP] Japan ................................ 62-090725
Apr. 24, 1987 [JP] Japan ................................ 62-061476

[51] Int. Cl.$^5$ .......................................... G02B 27/14
[52] U.S. Cl. .................................. 350/174; 350/602; 350/623
[58] Field of Search ............... 350/169, 171, 174, 602, 350/603, 612, 618, 622, 623; 340/705

[56] References Cited

U.S. PATENT DOCUMENTS

| | | | |
|---|---|---|---|
| 1,871,877 | 8/1932 | Buckman | 350/174 |
| 3,663,112 | 5/1972 | Jones et al. | 350/174 |
| 3,697,154 | 10/1972 | Johnson | 350/174 |
| 3,848,974 | 11/1974 | Hosking et al. | 350/174 |
| 4,167,113 | 9/1979 | Mann | 350/174 |
| 4,711,544 | 12/1987 | Iino et al. | 353/14 |
| 4,714,320 | 12/1987 | Banbury | 340/705 |
| 4,746,206 | 5/1988 | Kusztos et al. | 350/605 |
| 4,761,056 | 8/1988 | Evans et al. | 350/174 |
| 4,787,711 | 11/1988 | Suzuki | 350/174 |
| 4,804,836 | 2/1989 | Iino | 250/201 |
| 4,806,904 | 2/1989 | Watanuki | 340/705 |
| 4,831,366 | 5/1989 | Iino | 340/705 |
| 4,837,551 | 5/1989 | Iino | 340/52 R |
| 4,886,328 | 12/1989 | Iino | 340/705 |
| 4,908,611 | 3/1990 | Iino | 340/705 |

FOREIGN PATENT DOCUMENTS

| | | |
|---|---|---|
| 2304175 | 8/1973 | Fed. Rep. of Germany . |
| 3347271 | 8/1986 | Fed. Rep. of Germany . |
| 2242695 | 3/1975 | France .................... 350/174 |
| 0094825 | 7/1980 | Japan ...................... 350/174 |
| 2154020 | 8/1985 | United Kingdom ....... 340/705 |
| 2154020 | 8/1985 | United Kingdom ....... 340/705 |
| 2154757 | 9/1985 | United Kingdom ....... 340/705 |
| 2182456 | 5/1987 | United Kingdom ....... 340/705 |
| 2182159 | 10/1987 | United Kingdom . |

OTHER PUBLICATIONS

Patent Abstracts of Japan M-583, Apr. 22, 1987, vol. 11/No. 8.
Patent Abstracts of Japan M-607, Jul. 15 1987, vol. 11/No. 218.

Primary Examiner—Rodney B. Bovernick
Assistant Examiner—Ronald M. Kachmarik
Attorney, Agent, or Firm—Wigman & Cohen

[57] ABSTRACT

A display apparatus for a vehicle comprises a unit for projecting a display pattern provided by a display device onto a projecting face in front of a driver's seat; a unit for visually overlapping an outer landscape in front of a front glass and a virtual image of the display pattern provided by the projecting unit; a first mirror for reflecting light from the projecting unit; and a second mirror for reflecting light reflected from the first mirror on the side of the driver's seat such that the virtual image of the display pattern in front of the second mirror is visualized. The display apparatus for a vehicle may comprise another mirror unit for reflecting the light reflected from the first mirror towards the front glass, the reflected light from the second mirror being reflected by the front glass on the driver's seat side such that the virtual image of the display pattern in front of the front glass is visualized. The display apparatus for a vehicle may comprise a device for adjusting the angular position of the mirror with respect to at least one of the forward-backward direction and the right-left direction.

20 Claims, 7 Drawing Sheets

# DISPLAY APPARATUS FOR A VEHICLE

This is a continuation of co-pending application Ser. No. 181,583 filed on Apr. 14, 1988, now abandoned.

The present invention relates to a display apparatus for a vehicle, and in particular, to the so-called head-up display apparatus in which a display pattern provided by a display device is projected onto a projecting face in front of a driver's seat, and a virtual image of the display pattern visually overlaps an outer landscape in front of a front glass.

BACKGROUND OF THE INVENTION

Figure 1:
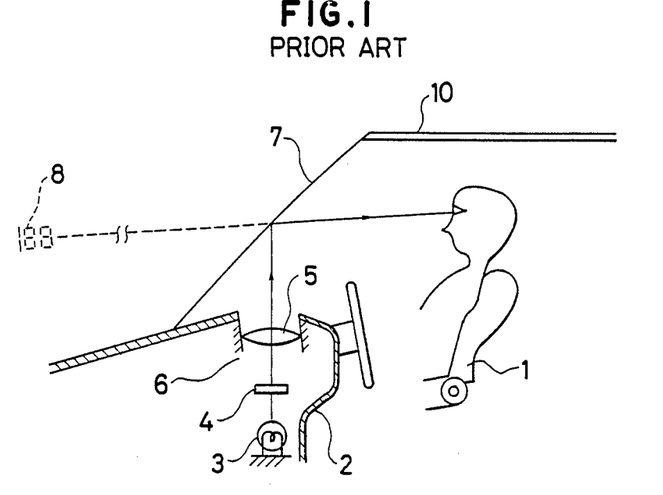
FIG. 1 is a schematic view showing a conventional display apparatus for a vehicle.

FIG. 1 shows a conventional head-up display apparatus of this kind. In FIG. 1, a dash board 2 is disposed in front of a driver's seat 1 of a vehicle, and a projector 6 composed of a light source 3, a display device 4 and a lens 5 is disposed within the dash board 2. An image of a display pattern on the display device 4 of the projector 6 is reflected by a front glass 7 and is visualized as a virtual image 8 in front of the front glass 7.

The display device 4 is generally constituted by a fluorescent lamp display tube, a an LED, a liquid crystal display (LCD), etc. In the case of LCD, a display pattern is projected onto the front glass 7 by light illuminated and penetrated from a rear portion of the apparatus. The lens 5 enlarges the virtual image 8 of the projected display pattern, and forms the image 8 in predetermined positions in front of the front glass 7.

In the head-up display apparatus for a vehicle, a driver visually overlaps an outer landscape through the front glass 7 and a displayed image so that it is not necessary to move the driver's line of sight during the operation of the vehicle, thereby rapidly reading the display and safely driving the vehicle.

However, in the conventional head-up display apparatus, since the image is directly projected from an upper face of the dash board onto a face of the front glass 7, the optical path from the dashboard to the projected face is short so that the display image 8 is formed in a relatively close position in front of the front glass 7. As a result, the driver must repeatedly focus the outer landscape and the displayed image 8 so that a suitable visuality cannot be obtained and the driver's eyes are tired. It is considered that another lens is inserted into the optical path to form the displayed image 8 distantly. However, such an arrangement increases the cost of the apparatus, which is not preferable.

Figure 2:
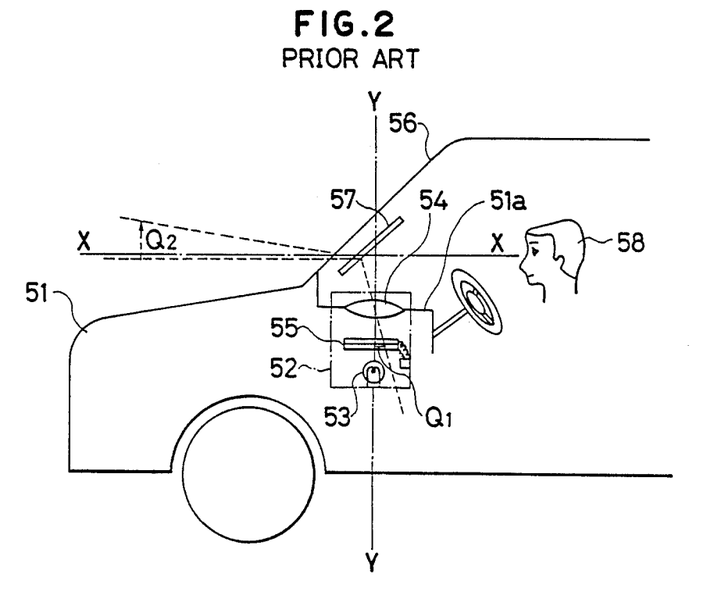
FIG. 2 is a schematic view showing a conventional display apparatus for a vehicle.

Another conventional display apparatus is disclosed in Japanese Laid-Open 50-48576 for example. In this example, as shown in FIG. 2, an apparatus has a projector attached to a dashboard 51a of a vehicle 51 and composed of a light source 53, a convex lens 54, and a display unit 55 for displaying speed information, etc., of the vehicle 51, which are stored within a casing 52 of the apparatus.

An image $Q_1$ displayed in the display unit 55 is projected through the convex lens 54 onto a half mirror 57 as a reflecting member disposed near a front glass 56, and a virtual image $Q_2$ is formed in front of the half mirror 57.

Figure 3A:
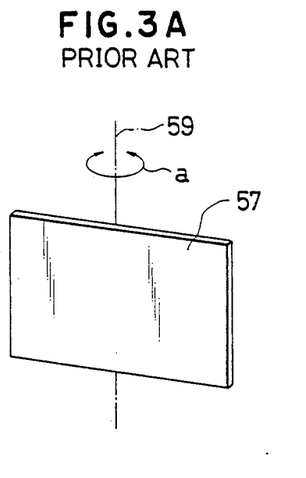
FIGS. 3A and 3B are views showing the movement of a half mirror disposed in the apparatus of FIG. 2 in the forward-backward direction and the right-left direction.
Figure 3B:
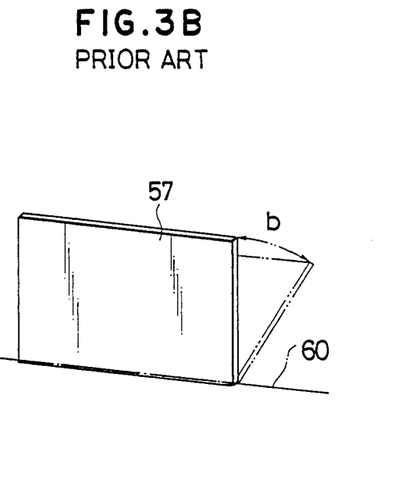

In such a conventional apparatus, as shown in FIGS. 3A and 3B, the half mirror 57 is moved around a vertical axis 59 and a horizontal axis 60 in the right-left direction "a" and forward-backward direction "b" to adjust the angle of the reflecting member such that the virtual image $Q_2$ formed in front of the front glass 56 can be visualized in a predetermined position irrespective of different positions and drivers of varying heights and/or physique 58. The adjusted position of the reflecting member is fixed by rotating individual thumbscrews respectively disposed with respect to the horizontal and vertical axes 59 and 60. Accordingly, it is necessary to operate the two thumbscrews before and after the adjustment of the position of the reflecting member so that it is laborious to operate these thumbscrews and the number of parts is increased, and the apparatus is complicated, and it takes time to manufacture and assemble the apparatus, thereby increasing the cost thereof.

SUMMARY OF THE INVENTION

With the problems mentioned above, an object of the present invention is to provide a display apparatus for a vehicle in which the cost of the apparatus is reduced and the apparatus has an excellent visuality.

Another object of the present invention is to provide an attaching structure of a light reflecting member in a display apparatus for a vehicle in which the adjustment of an attaching angle of the light reflecting member is simplified.

Another object of the present invention is to provide an attaching structure of a light reflecting member in a display apparatus for a vehicle in which the number of parts is reduced.

Another object of the present invention is to provide an attaching structure of a light reflecting member in a display apparatus for a vehicle in which it is easy to manufacture and assemble the apparatus.

Another object of the present invention is to provide an attaching structure of a light reflecting member in a display apparatus for a vehicle in which the cost of the apparatus is reduced.

With the above objects in view, the present invention resides in a display apparatus for a vehicle comprising means for projecting a display pattern provided by a display means onto a projecting face in front of a driver's seat; means for visually overlapping an outer landscape in front of a front glass and a virtual image of the display pattern provided by the projecting means; first mirror means for reflecting light from the projecting means; and second mirror means for reflecting light reflected from the first mirror means on the side of the driver's seat such that the virtual image of the display pattern in front of the second mirror means is visualized.

The display apparatus for a vehicle may comprise second mirror means for reflecting the light reflected from the first mirror means towards the front glass, the reflected light from the second mirror means being reflected by the front glass on the driver's seat side such that the virtual image of the display pattern in front of the front glass is visualized.

The display apparatus for a vehicle may comprise means for adjusting the angular position of the mirror means with respect to at least one of the forward-backward direction and the right-left direction.

BRIEF DESCRIPTION OF THE DRAWINGS

The present invention will be more apparent from the following description of the preferred embodiments thereof in conjunction with the accompanying drawings in which.

DETAILED DESCRIPTION OF THE PREFERRED EMBODIMENTS

The preferred embodiments of the present invention will now be described with reference to the accompanying drawings.

Figure 4:
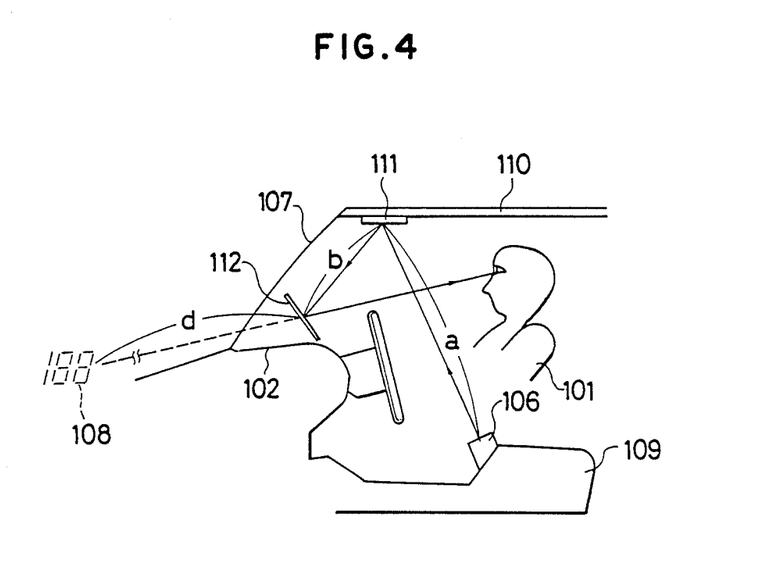
FIG. 4 is a schematic view showing the structure of a display apparatus for a vehicle in accordance with one embodiment of the present invention.

FIG. 4 shows a display apparatus in accordance with an embodiment of the present invention. A projector 106 is attached to a center console 109 located in a lower side portion of a driver's seat 101, and stores therein a light source, a display device, etc., which are not shown. A first mirror 111 is fixed to a ceiling 110 in front of the driver's seat, and is constituted by a total reflection mirror. A second mirror 112 is disposed on an upper face of a dashboard 102, and is constituted by a half mirror.

Light from the projector 106 is reflected by the first mirror 111 as shown in FIG. 4, and thereafter reaches the second mirror 112, and the driver can look at the light reflected by the second mirror 112. Accordingly, the image of the display pattern is formed as a virtual image 108 in front of the second mirror 112, and the driver visually overlaps the virtual image 108 and an outer landscape through the second mirror 112 constituted by a half mirror.

In this case, the optical path from the projector 106 to the second mirror 112 as a projecting face is the sum of distance a from the projector 106 to the first mirror 111, and distance b from the first mirror 111 to the second mirror 112. Accordingly, distance d from the second mirror 112 to the front virtual image 108 is equal to the distance $(a+b)$. Accordingly, with respect to the relation of the positions of center console 109, ceiling 110, and dashboard 102 is a general vehicle, the virtual image 108 is formed forwards by about 1.5 to 2.0 m from the front glass 107, which is near the position of the outer landscape.

Figure 5:
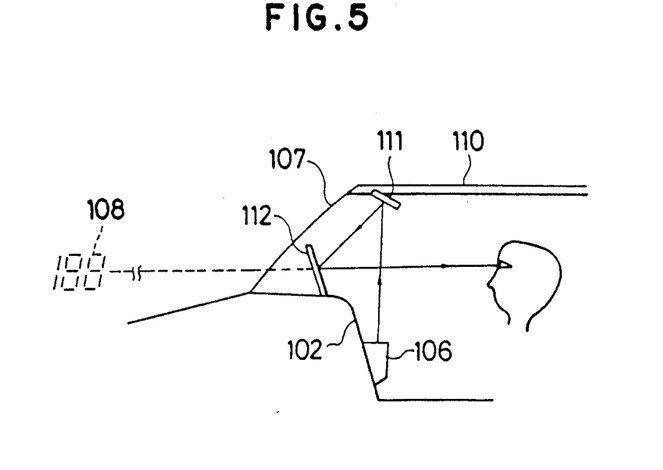
FIGS. 5 and 6 are schematic views showing the structure of a display apparatus for a vehicle in accordance with other embodiment of the present invention.
Figure 6:
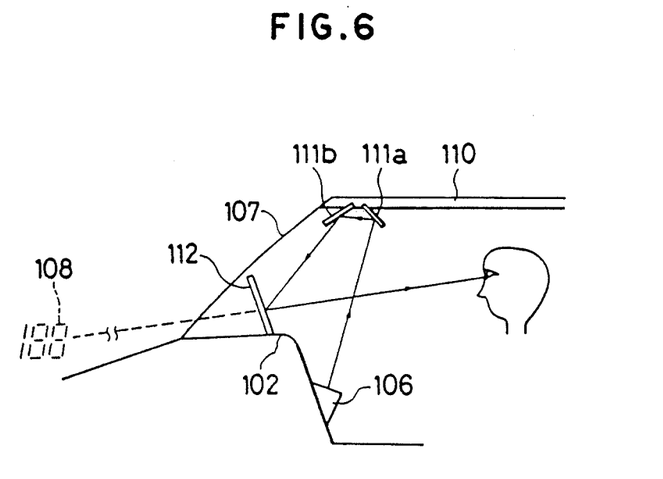

FIGS. 5 and 6 respectively show another embodiment of the present invention. In the display apparatus of FIG. 5, a projector 106 is attached to a portion under the front face of a dashboard 102 in a position in which an ash tray for example is disposed, and light from the projector 106 is projected to a first mirror 111 attached to the ceiling 110. In the display apparatus of FIG. 6, as well as the apparatus in FIG. 5, a projector 106 is attached to a portion under the front face of the dash,.board, and a first mirror 111 disposed in the ceiling 110 is constituted by two total reflection mirrors 111a and 111b.

Even in such embodiments mentioned above, the optical path from the projector 106 to the second reflection mirror 112 is relatively long so that the virtual image 108 of the display pattern can be formed in front of the front glass near the outer landscape.

Figure 7:
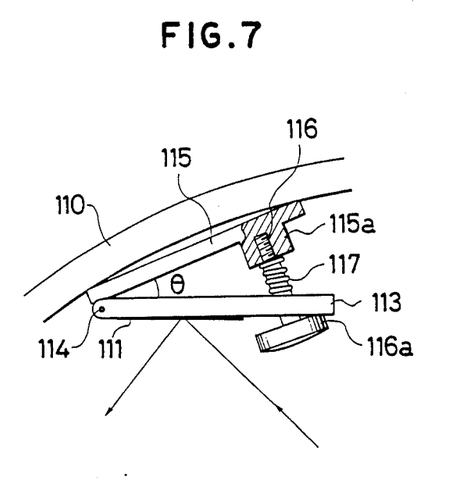
FIG. 7 is a view showing the attaching structure of a first mirror in the embodiments of the present invention.
Figure 8:
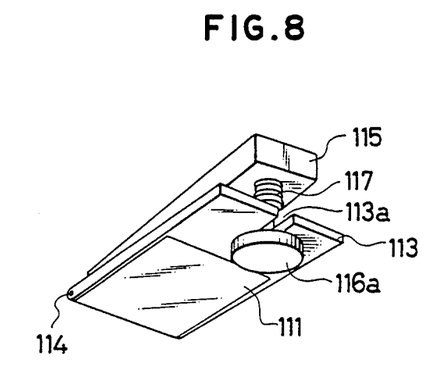
FIG. 8 is a view showing the appearance of the first mirror of FIG. 7.

FIGS. 7 and 8 show a structure in which the attaching position of the first mirror 111 in the above embodiments can be adjusted.

In general, the positions of line of sight of drivers are different from each other so that it is necessary to adjust the optical path in accordance with the positions or height of the line of sight of the drivers to visually look at the virtual image 108 in a proper position. Accordingly, in the embodiments of the present invention, the first mirror 111 attached to the ceiling 110 can be adjusted with respect to the attaching angle thereof with respect to the horizontal direction.

Such a structure will next be described in detail with reference to FIGS. 7 and 8. The first mirror 111 is stuck to a mirror base 113 rotatably supported at one end thereof by a base 115 through a support shaft 114. A groove 113a is disposed at the other end of the mirror base 113, and a screw 116 inserted into the groove 113a is screwed into a screw receiving portion 115a of the base 115. An adjusting thumbscrew 116a is disposed in a head portion of the screw 116, and a coil spring 117 is disposed around the outer circumference of the screw 116 between the mirror base 113 and the screw receiving portion 115a, and biases the mirror base 113 on the side of the adjusting thumbscrew 116a at any time. Accordingly, the mirror base 113 is rotated around the support shaft 114 by rotating the adjusting thumbscrew 116a so that the reflection angle of light from the projector 106 can be adjusted, thereby properly changing the position of the virtual image 108 with respect to the line of sight.

In the embodiments mentioned above, the second mirror 112 disposed on the upper face of the dashboard 102 in front of the front glass 107 approaches at an end thereof the front glass 107 opposite the side of the driver, thereby improving the safety of the driver.

In the above embodiments mentioned above, a single half mirror is used as a second mirror 112, but a plurality of mirrors constituting the second mirror 112 may be used on the dashboard 102 to obtain a longer optical path.

As mentioned above, in accordance with the present invention, light from a projector is guided to a driver through a first mirror in the ceiling and a second mirror on a dashboard without using a lens. Accordingly, the optical path from the projector to the second mirror or a projecting face is long so that a virtual image of a display pattern can be distantly formed. Thus, the driver can look at a displayed image with the focal point thereof near an outer landscape, thereby improving the visuality and reducing the tiredness of the driver. Further, since no lens is used, the cost of the apparatus can be reduced.

Figure 9:
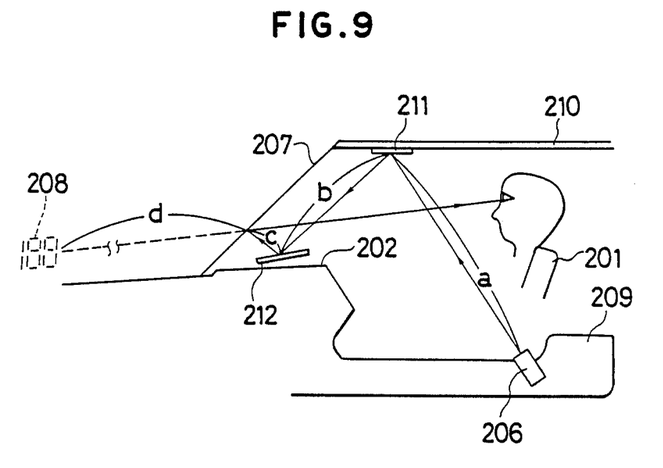
FIG. 9 is a schematic view showing another embodiment of the present invention.
Figure 10:
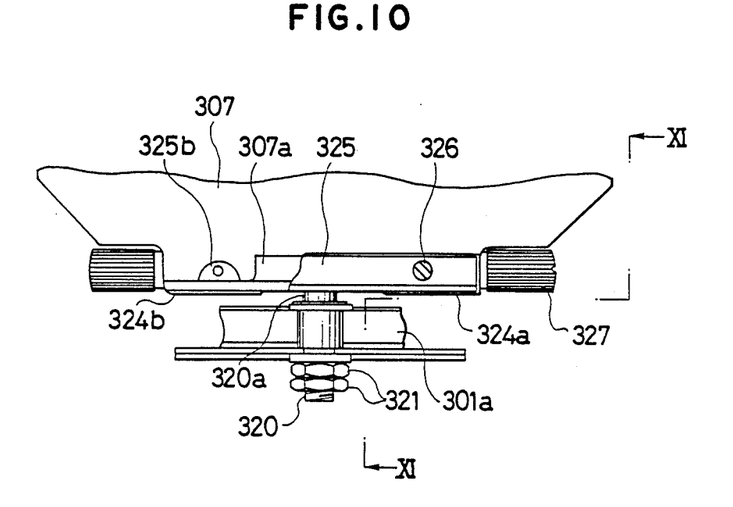
FIG. 10 is a partially cross-sectional front view showing a device for attaching a light reflecting member in the present invention.
Figure 11:
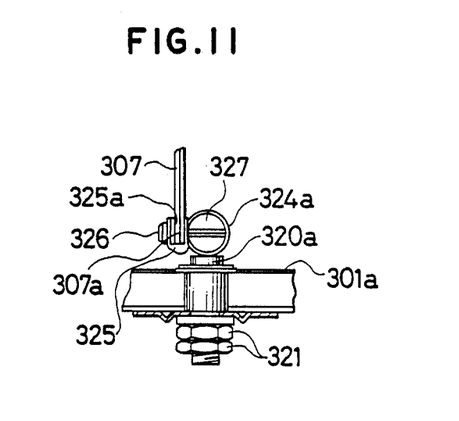
FIG. 11 is a cross-sectional view taken along Line XI—XI of FIG. 10.

FIG. 9 shows another embodiment of the present invention. In this embodiment, light from a projector 206 is reflected by a first mirror 211 disposed in a ceiling 210, and reaches a second mirror 212, and the light reflected by the second mirror 212 is also reflected by a front glass 207, and reaches the eyes of a driver.

Accordingly, an image 208 of a display pattern of a display device is formed as a virtual image in the front glass 207 so that the driver virtually overlaps this virtual image 208 and an outer landscape.

In this case, the optical path from the projector 206 to the front glass 207 as a projecting face is the sum of distance a from the projector 206 to the first mirror 211, distance b from the first mirror 211 to the second mirror 212, and distance c from the second mirror 212 to the front glass 207. Accordingly, distance d from the front glass 207 to the front virtual image 208 is equal to the sum of distance (a+b+c) and a change $\alpha$ caused by lens effects due to the curvature of the front glass 207. Thus, the virtual image 208 is formed forwards by about 1.8 to 2.3 m from the front glass 207, which is near the position of an outer landscape, by using the relation of the positions of a center console 209, the ceiling 210, and a dashboard 202 in a general vehicle. In addition, the virtual image 208 is slightly enlarged by the lens effects of the front glass 207.

In this embodiment, the second mirror 212 on the dash board 202 is not used as a projecting face, and is approximately horizontally arranged so that the second mirror 212 does not obscure the driver's forward field of view and there is no feeling of an obstacle.

The projector is disposed in the center console 209 in the above embodiment, but can be disposed in a lower portion of the front face of the dash, board 202 on the driver's side.

The first mirror 211 disposed in the ceiling 210 is composed of a single mirror, but can be composed of a plurality of mirrors such that the light is sequentially reflected by the plurality of mirrors and is reflected to the second mirror 212 on the dashboard.

As mentioned above, in this embodiment of the present invention, an image of a display pattern of a display device is formed onto a front glass from a first mirror disposed in a ceiling through a second mirror on a dashboard.

Accordingly, the optical path from a projector to a projecting face can be longer so that a virtual image of the display pattern can be distantly formed. Thus, a driver can visually observe the image with the focal point thereof near an outer landscape so that the visuality is improved and the tiredness of the driver's eyes is reduced. Further, the cost of the apparatus can be reduced since no lens for displaying a distant landscape is used in the projector.

FIGS. 10 to 13 show a device for attaching a light reflecting member in a display apparatus for a vehicle. Such a device may be used in the structures mentioned above.

A vertical support shaft 320 has a step portion 320a, and is attached by an attaching unit 321 onto the upper face of a dashboard 301a near a front glass.

A bar-shaped horizontal shaft member 322 has a central large diameter portion 322', and a hole 322a extending through the central large diameter portion 322' and receiving the vertical support shaft 320. The horizontal shaft member 322 is rotatably supported by the stop portion 320a of the vertical support shaft 320, and has small diameter shaft portions 322b and 322c formed at both ends thereof.

A generally cylindrical restricting member 323 is slidably fitted onto the large diameter portion 322' of the horizontal shaft member 322 in the axial direction thereof, and has a central hole 323a in alignment with the hole 322a of the horizontal shaft member 322. The vertical support shaft 320 is rotatably inserted into the hole 323a.

The diameter of the restricting member 323 is larger than that of the large diameter portion 322' of the horizontal shaft member 322.

Reference numerals 324a and 324b designate attaching members of the reflecting member, and the one attaching member 324a has a through hole $324a_1$ rotatably receiving the shaft portion 322b of the horizontal shaft member 322, and the other attaching member 324b has a hole $324b_1$ rotatably receiving the shaft portion 322c of the horizontal shaft member 322.

Figure 13:
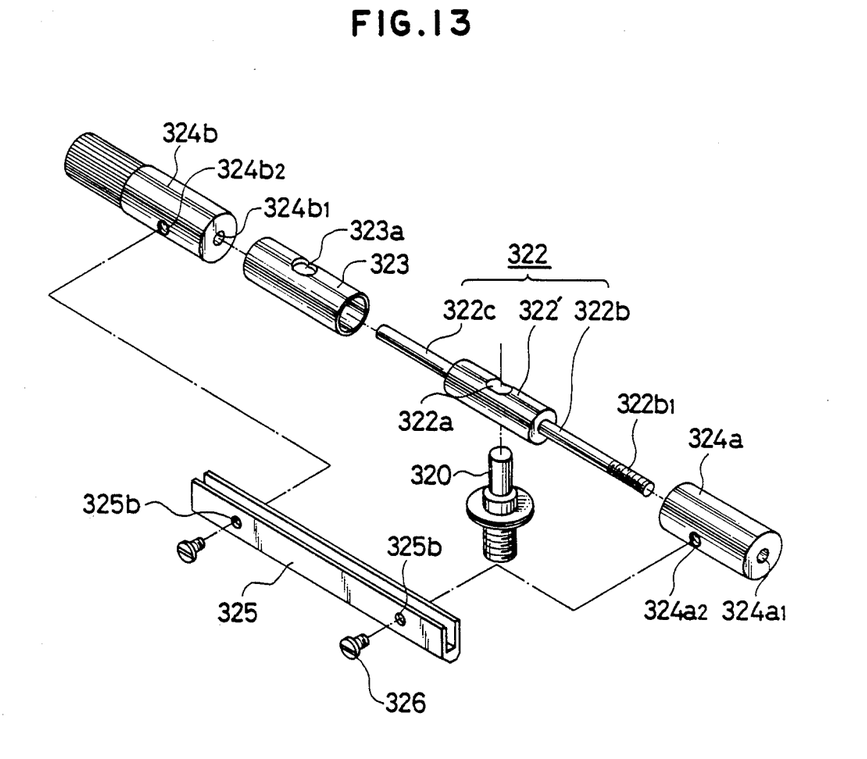
FIG. 13 is an exploded perspective view of the attaching device.

A connecting bar 325 connects the attaching members 324a and 324b to each other, and has a recessed portion 325a into which a lower edge 307a of a half mirror 307 is fitted. As shown in FIG. 13, screws 326 are screwed into screw holes $324a_2$ and $324b_2$ disposed in the attaching members 324a and 324b, through holes 325b of the connecting bar 325 in the fitted state of the half mirror 307. Thus, the half mirror 307 is fixed to the attaching members 324a and 324b, and the attaching members 324a and 324b are then connected to each other.

A thumbscrew 327 as an operating means is screwed to a screw portion $322b_1$ disposed at an end of the shaft portion 322b.

Figure 12:
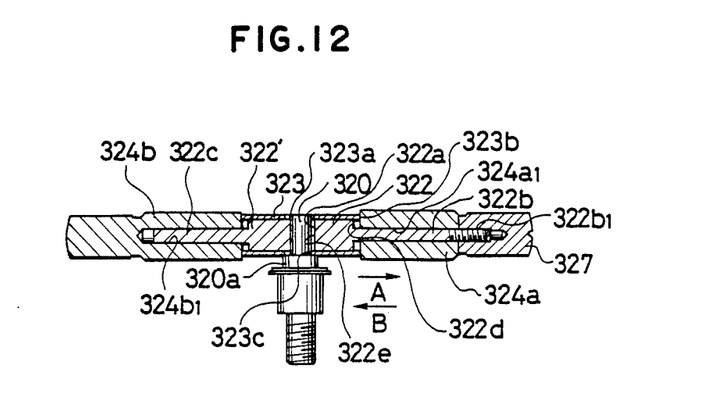
FIG. 12 is a longitudinally cross-sectional view of the attaching device.

In FIG. 12, when the thumbscrew 327 is fastened, the attaching member 324a is pressed by the thumbscrew 327 in the direction of arrow B, and then contacts an outer end 323b of the restricting member 323. Accordingly, the restricting member 323 is also moved in the direction of arrow B, and the inner circumference 323c of the hole 323a contacts the outer circumference of the vertical support shaft 320, thereby restricting the movements of the restricting member 323 and the attaching member 323b in the direction of arrow B. In this state, when the thumbscrew 327 is further fastened, the horizontal shaft member 322 is moved in the direction of arrow A so that the inner circumference 322e of the hole 322a contacts the outer circumference of the vertical support shaft 320. Accordingly, by strongly fastening the thumbscrew 327, the attaching member 324a and the restricting member 323 are pressed and held between the vertical support shaft 320 and the thumbscrew 327, thereby restricting the rotation of the horizontal shaft member 322 with respect to the vertical support shaft 320, and the rotation of the attaching member 324a with respect to the horizontal shaft member 322. Thus, the half mirror 307 attached to the attaching members 324a and 324b through the connecting bar 325 cannot be rotated or moved in the right-left direction and the forward-backward direction.

When the thumbscrew 327 is unfastened in this state, the pressing and holding state of the attaching member 324a and the restricting member 323 between the thumbscrew 327 and the vertical support shaft 320 is released, and the attaching members 324a and 324b can be rotated around the shaft portions 322b and 322c of the horizontal shaft member 322, and the horizontal shaft member 322 can be rotated around the vertical support shaft 320.

Thereafter, the angle of the half mirror 307 is adjusted by moving the half mirror to a predetermined angle position in the forward-backward direction and the right-left direction.

After that, when the thumbscrew 327 is fastened, the attaching member 324a and the restricting member 323 are pressed and held between the vertical support shaft 320 and the thumbscrew 327 as described before, so that the half mirror is fixed in position after the angular adjustment of the half mirror 307.

As mentioned above, the rotations of the horizontal shaft member 322 with respect to the vertical support shaft 320, and the attaching member 324a with respect to the horizontal shaft member 322 can be restricted, and the restriction thereof can be released by rotating the single thumbscrew 327, thereby adjusting the attaching angle of the half mirror 307.

In the embodiment mentioned above, two attaching members 324a and 324b are used to stabilize the attachment of the half mirror 307, but the one attaching member 324b may for example be removed when the half mirror 307 is attached to only the other attaching member 324a.

As mentioned above, in accordance with the present invention, the attaching angle of a half mirror can be adjusted by only rotating a single thumbscrew in the forward-backward direction and the right-left direction, thereby improving the operability of the apparatus.

Further, since only one thumbscrew operating means is needed in comparison with the conventional apparatus requiring with two thumbscrews, the number of parts is reduced so that the structure is simplified, and it is easy to manufacture and assemble the apparatus, and the cost thereof is also reduced.

What is claimed is:

1. A display apparatus in an automotive vehicle comprising:
   a display unit producing a visual display pattern;
   a driver's seat within said automobile;
   a projecting face in front of said driver's seat;
   a windshield in front of said driver's seat, said windshield having a driver's seat side;
   a ceiling at least partially located above said driver's seat;
   a vehicle dashboard in front of said driver's seat;
   means disposed within said vehicle for projecting a display pattern provided by the display unit onto the projecting face in front of the driver's seat;
   means for visually overlapping an outer landscape in front of the windshield and a virtual image of the display pattern provided by the means for projecting;
   first flat mirror means for reflecting light from the means for projecting; and
   second flat mirror means, disposed on the vehicle dashboard, for reflecting light reflected from the first mirror means on the driver's seat side of the windshield such that the virtual image of the display pattern in front of the second mirror means is visualizable;
   wherein the first flat mirror means is disposed on the ceiling of the automotive vehicle in order to lengthen a display optical path from the projecting means to the second flat mirror means without providing any lens therebetween, whereby the virtual image of the display pattern can be produced at a position relatively far from a driver in front of the windshield, whereby the driver can realize the virtual image on the landscape within his normal driving focal range.

2. A display apparatus as in claim 1, wherein the first flat mirror means comprises a first mirror, a mirror support member for supporting the first mirror, a base attached tot he ceiling of the vehicle and pivotally supporting the mirror support member, and means for adjusting the angle of the mirror support member with respect to the base.

3. A display apparatus for lengthening a display optical path in an automotive vehicle comprising:
   a display unit producing a visual display pattern;
   a driver's seat within said automobile;
   a projecting face in front of said driver's seat;
   a windshield in front of said driver's seat, said windshield having a driver's seat side;
   a ceiling at least partially located above said driver's seat;
   a vehicle dashboard in front of said driver's seat;
   means disposed within said vehicle for projecting a display pattern provided by the display unit onto the projecting face in front of the driver's seat;
   means for visually overlapping an outer landscape in front of the windshield and a virtual image of the display pattern provided by the means for projecting;
   first flat mirror means, disposed on the ceiling of the automotive vehicle, for reflecting light from the means for projecting; and
   second flat mirror means, disposed on the vehicle dashboard, for reflecting light reflected from the first mirror means on the driver's seat side of the windshield such that the virtual image of the display pattern in front of the second mirror means is visualizable; wherein said automotive vehicle includes a forward-backward direction and a right-left direction and wherein said second mirror means includes;
   means for adjusting the angular position of the second mirror with respect to at least one of the forward-backward direction and the right-left direction of the automotive vehicle.

4. A display apparatus as in claim 3, wherein the second mirror comprises a half mirror.

5. A display apparatus as in claim 3, wherein said adjusting means comprises a vertical support shaft, a horizontal shaft member rotatably fitted to the vertical support shaft, an attaching unit for attaching the light reflecting means to the horizontal shaft member, a restricting member slidably fitted to the horizontal shaft member in the axial direction thereof, and thumbscrew means for axial adjustment of the restricting member with respect to the horizontal shaft member.

6. A display apparatus as in claim 5, wherein the attaching unit is rotatably fitted to the horizontal shaft member, and is slidably fitted to the horizontal shaft member in the axial direction thereof.

7. A display apparatus as in claim 5, wherein the restricting member and the attaching unit are pressed and held between the vertical support shaft and the thumbscrew.

8. A display apparatus as claimed in claim 5, wherein said adjusting means is disposed on a dashboard.

9. A display apparatus in an automotive vehicle, the automotive vehicle having a driver's seat within said automobile, a windshield in front of said driver's seat, said windshield having a driver's seat side, a ceiling at least partially located above said driver's seat, and a vehicle dashboard in front of said driver's seat, and the display apparatus comprising:

a display unit producing a visual display pattern;

a projecting face in front of said driver's seat;

means disposed within said vehicle for projecting a display pattern provided by the display unit onto the projecting face in front of the driver's seat;

means for visually overlapping an outer landscape in front of the windshield and a virtual image of the display pattern provided by the projecting means;

first flat mirror means, arranged on the ceiling of the automotive vehicle, for reflecting light from the projecting means; and second flat mirror means, arranged on the vehicle dashboard in front of the driver's seat, for reflecting light reflected from the first mirror means towards the windshield, the reflected light from the second mirror means being reflected by the windshield on the driver's seat side such that the virtual image of the display pattern is visualizable in front of the windshield;

wherein the arrangement of the first and second flat mirror means serves to lengthen a display optical path from the projecting means to the second flat mirror means without providing any lens therebetween, whereby the virtual image of the display pattern can be produced at a position relatively far from a driver in front of the windshield, at which the driver can visually overlap the virtual image on the landscape within his normal driving focal range.

10. A head-up display device for a vehicle operated by a driver having a forward line-of-sight and being seated in a vehicle compartment including a ceiling, a dashboard, and a front glass, comprising:

means for projecting a light image in space, said projection means being mounted within said vehicle compartment;

a first planar mirror for reflecting at least a portion of said projected light image, said first planar mirror being spaced from said projection means to provide therebetween a first image path "a" and said planar mirror being movably attached to the vehicle ceiling above the line-of-sight of the driver in order to lengthen the first image path "a" as long as possible without providing any lens between the projecting means and the planar mirror; and at least one additional menas for reflecting at least a portion of said projected light image, said at least one additional means for reflecting being spaced from said planar mirror to provide therebetween an additional image path "b" in a field of view which includes the line-of-sight of the driver and which provides a virtual image at a place of focus in said field of view;

wherein the virtual image place of focus is external to the vehicle and spaced a distance "d" from the last additional means for reflecting, and wherein the image paths "a" and "b" have a total length dimension at least equal to distance "d", whereby the virtual image can be produced at a position relatively far from the driver in front of the windshield, where the driver can realize the virtual image on a landscape in front of the vehicle within his normal driving focal range.

11. The display device of claim 10, wherein said first planar mirror is movably attached to the vehicle ceiling.

12. The display device of claim 10, wherein said at least one additional means for reflecting is the vehicle front glass.

13. The display device of claim 10, wherein the virtual image plane of focus is spaced a distance of about 3 to 6 meters from the driver.

14. The display device of claim 10, wherein the front glass is a frontward vehicle windshield and the virtual image plane of focus is spaced a distance of about 1.5 to about 3 meters from the vehicle windshield.

15. A head-up display device for a vehicle operated by a driver having a forward line-of-sight and being seated in a vehicle compartment including a ceiling, a dashboard, and a front glass, comprising:

means for projecting a light image in space, said projection means being mounted within said vehicle compartment;

a first planar mirror for reflecting at least a portion of said projected light image, said first planar mirror being spaced from said projection means to provide therebetween a first image path "a" and being movably attached to the vehicle ceiling above the line-of-sight of the driver;

a second planar mirror for reflecting at least a portion of said projected light image, said second planar mirror being spaced from said first planar mirror to provide therebetween a second image path "b" and being attached to the vehicle dashboard below the line-of-sight of the driver; and at least one additional means for reflecting at least a portion of said projected light image, said at least one additional means for reflecting being spaced from said second planar mirror to provide therebetween an additional image path "c" in a field of view which includes the line-of-sight of the driver and which provides a virtual image at a plane of focus in said field of view;

wherein the virtual image plane of focus is external to the vehicle and spaced a distance "d" from the last additional means for reflecting, and wherein the image paths "a", "b" and "c" have a total length dimension at least equal to distance "d", and the first planar mirror, the second planar mirror and the at least one additional means are arranged such that the distance "d" becomes sufficiently long, whereby the virtual image can be produced at a position relatively far from the driver in front of the windshield, where the driver can visually overlap the virtual image on a landscape in front of the vehicle within his normal driving focal range.

16. The display device of claim 15, wherein said second planar mirror is movably attached to the vehicle dashboard.

17. A head-up display device for a vehicle operated by a driver having a forward line-of-sight and being seated in a vehicle compartment including a ceiling, a dashboard, and a front glass, comprising:

means for projecting a light image in space, said projection means being mounted within said vehicle compartment;

a first planar mirror for reflecting at least a portion of said projected light image, said first planar mirror being spaced from said projection means to provide therebetween a first image path "a" and being movably attached to the vehicle ceiling above the line-of-sight of the driver;

a second planar mirror for reflecting at least a portion of said projected light image, said second planar mirror being spaced from said first planar mirror to provide therebetween a second image path "b" and being attached to the vehicle dashboard below the line-of-sight of the driver; and at least one additional means for reflecting at least a portion of said projected light image, said at least one additional means for reflecting being spaced from said second planar mirror to provide therebetween an additional image path "c" in a field of view which includes the line-of-sight of the driver and which provides a virtual image at a plane of focus in said field of view;

wherein the virtual image plane of focus is external to the vehicle and spaced a distance "d" from the last additional means for reflecting, and wherein the image paths "a", "b" and "c" have a total dimension at least equal to distance "d"; wherein said at least one additional means for reflecting is the vehicle front glass.

18. The display device of claim 15, wherein the virtual image plane of focus is a steaight line to the driver less than the sum of distance "d, " the length of first image path "a," the length of second image path "b," and the length of third image path "c" from the driver.

19. A head-up display device for a vehicle operated by a driver having a forward line-of-sight and being seated in a vehicle compartment including a ceiling, a dashboard, and a front glass, comprising:

means for projecting a light image in space, said projection means being mounted within said vehicle compartment;

a first planar mirror for reflecting at least a portion of said projected light image, said first planar mirror being spaced from said projection means to provide therebetween a first image path "a" and being movably attached to the vehicle ceiling above the line-of-sight of the driver;

a second planar mirror for reflecting at least a portion of said projected light image, said second planar mirror being spaced from said first planar mirror to provide therebetween a second image path "b" and being attached to the vehicle dashboard below the line-of-sight of the driver, and at least one additional means for reflecting at least a portion of said projected light image, said at least one additional means for reflecting being spaced from said second planar mirror to provide therebetween an additional image path "c" in a field of view which includes the line-of-sight of the driver and which provides a virtual image at a plane of focus in said field of view;

wherein the virtual image plane of focus is external to the vehicle and spaced a distance "d" from the last additional means for reflecting, and wherein the image paths "a", "b" and "c" have a total length dimension at least equal to distance "d"; wherein the virtual image plane of focus is spaced a distance of about 3 to 6 meters from the driver.

20. A head-up display device for a vehicle operated by a driver having a forward line-of-sight and being seated in a vehicle compartment including a ceiling, a dashboard, and a front glass, comprising:

means for projecting a light image in space, said projection means being mounted within said vehicle compartment;

a first planar mirror for reflecting at least a portion of said projected light image, said first planar mirror being spaced from said projection means to provide therebetween a first image path "a" and being movably attached to the vehicle ceiling above the line-of-sight of the driver;

a second planar mirror for reflecting at least a portion of said projected light image, said second planar mirror being spaced from said first planar mirror to provide therebetween a second image path "b" and being attached to the vehicle dashboard below the line-of-sight of the driver; and at least one additional means for reflecting at least a portion of said projected light image, said at lest one additional means for reflecting being spaced from said second planar mirror to provide therebetween an additional image path "c" in a field of view which includes the line-of-sight of the driver and which provides a virtual image at a plane of focus in said field of view;

wherein the virtual image plane of focus is external to the vehicle and spaced a distance "d" from the last additional means for reflecting, and wherein the image paths "a", "b" and "c" have a total length dimension at least equal to distance "d"; wherein the front glass is a frontward vehicle windshield and the virtual image plane of focus is spaced a distance of about 1.5 to about 3 meters from the vehicle windshield.

* * * * *